United States Patent [19]
Fields

[11] Patent Number: 5,080,043
[45] Date of Patent: Jan. 14, 1992

[54] DISPOSABLE KITTY LITTER BOX

[76] Inventor: Ernest R. Fields, 721 Sedgefield Rd., Newport News, Va. 23605

[21] Appl. No.: 663,739

[22] Filed: Mar. 4, 1991

[51] Int. Cl.⁵ .......................................... A01K 29/00
[52] U.S. Cl. ................................... 119/168; 383/33; 383/120; 383/127
[58] Field of Search .............. 119/165, 168, 169, 170; 229/40; 206/427; 383/33, 120, 127, 902, 907

[56] References Cited

U.S. PATENT DOCUMENTS

| | | | |
|---|---|---|---|
| 2,741,223 | 4/1956 | Winborn | 119/165 |
| 2,931,490 | 4/1960 | McGihon | 206/427 |
| 3,085,550 | 4/1963 | Crawford | 119/165 |
| 3,157,309 | 11/1964 | Chidsey, Jr. et al. | 229/40 |
| 3,294,312 | 12/1966 | Mullins | 383/120 |
| 3,993,241 | 11/1976 | Downing | 229/40 |
| 4,029,048 | 6/1977 | Gershbein | 119/165 |
| 4,271,787 | 6/1981 | Wellman et al. | 119/168 |
| 4,348,982 | 9/1982 | Selby | 119/165 |
| 4,352,340 | 10/1982 | Strubelt | 119/165 |
| 4,800,842 | 1/1989 | Jones, Jr. | 119/168 |
| 4,846,103 | 7/1989 | Brown | 119/168 |
| 4,919,078 | 4/1990 | Morrison | 119/168 |

FOREIGN PATENT DOCUMENTS 2611666 9/1988 France .................. 119/165
2614502 11/1988 France .................. 119/165

Primary Examiner—Robert P. Swiatek
Assistant Examiner—Todd E. Manahan
Attorney, Agent, or Firm—Wallace J. Nelson

[57] ABSTRACT

An economical, disposable, container serving as an indoor toilet facility for household cats and formed of bio-degradable and/or recyclable components is disclosed. The foldable paper container has an internal, moisture impervious, coating and includes an open end, a closed end wall, a top and a bottom wall, and a pair of sidewalls connected to the top, bottom and closed end wall. A barrier wall, integral with the bottom wall, is spaced from the ends of the top and sidewalls and closes a fractional portion of the open end to form an open top compartment within the container. A quantity of granular, absorbent litter material is disposed within the open top compartment. When ready for use the container is unfolded or expanded with end portions of the top and sidewalls being folded back over themselves to assist in maintaining the container in the open position. The granular absorbent material may be (1) housed in a removable pocket formed with the bottom wall of the container, (2) housed in a cardboard box posiitonable within the open top compartment and having a removable protective covering thereon, or (3) poured directly into the open top compartment.

12 Claims, 2 Drawing Sheets

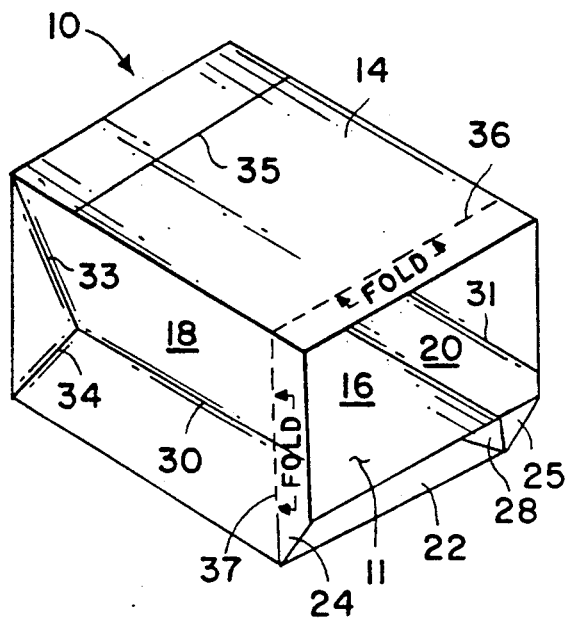
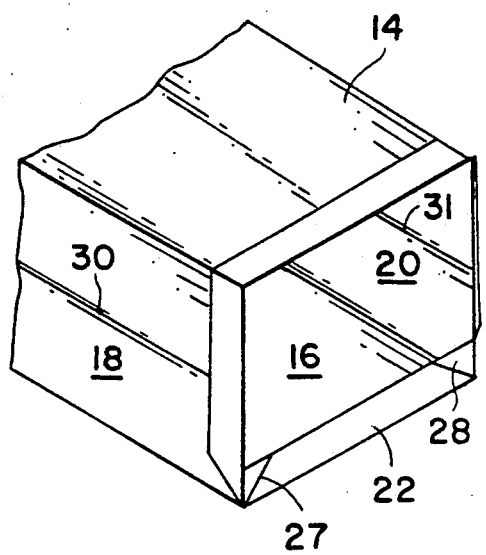
FIG. 1  FIG. 1a
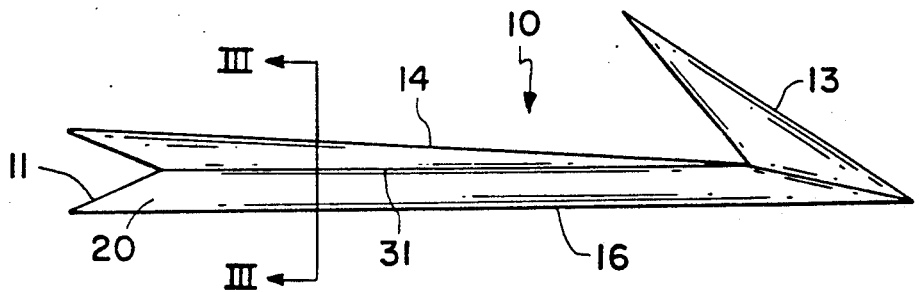
FIG. 2
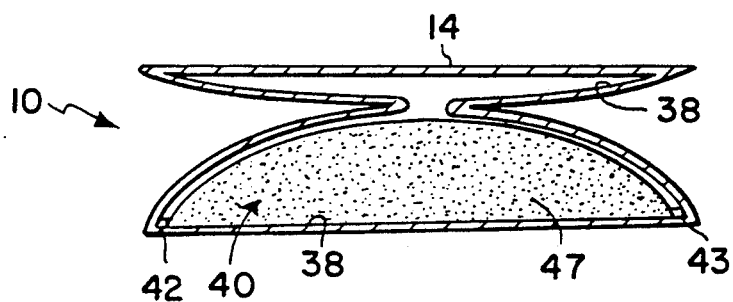
FIG. 5

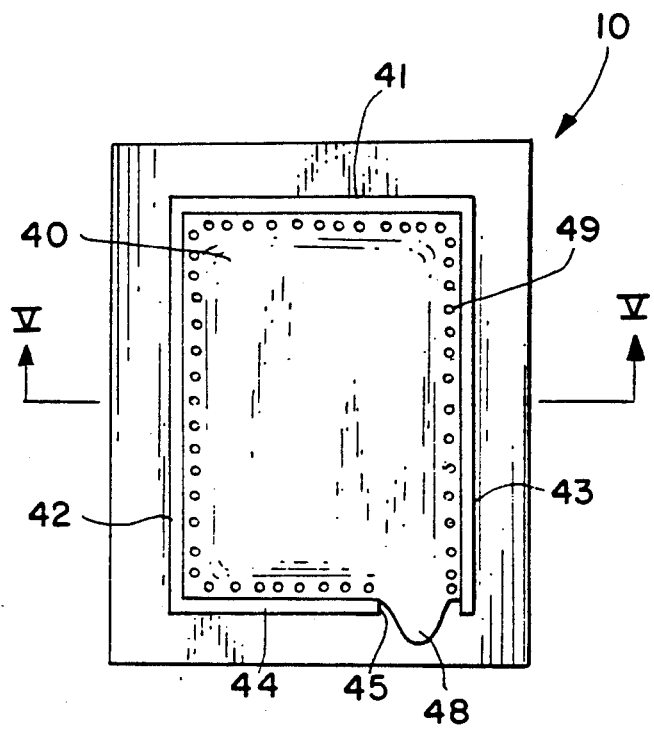
FIG. 4
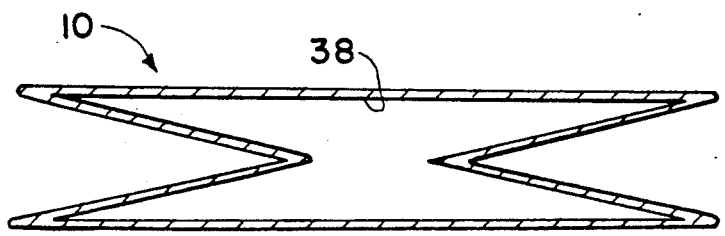
FIG. 3
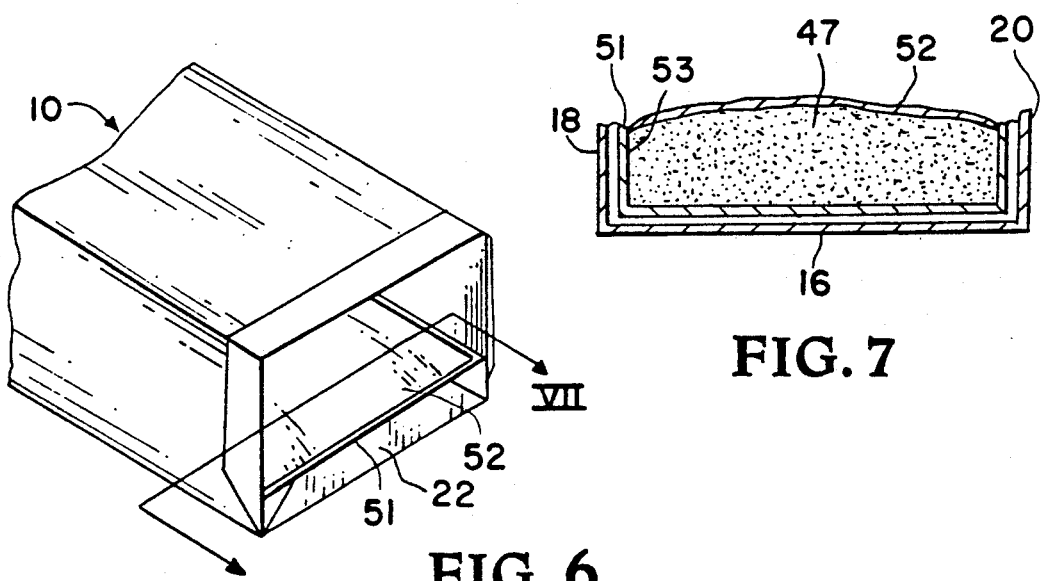
FIG. 7
FIG. 6

DISPOSABLE KITTY LITTER BOX

FIELD OF THE INVENTION

This invention relates generally to an indoor toilet facility for household cats, and other felines, and relates specifically to a compact, disposable, kitty litter box formed completely of bio-degradable and/or recyclable components and foldable to a compact mode when not in use to facilitate storage, shipping, and disposal.

BACKGROUND OF THE INVENTION

Owners of household cats and kittens normally provide a litter box for the pets' hygienic needs. These boxes conventionally consist of a wood, cardboard, or plastic vessel containing a quantity of sand, commercially available granular clay or other absorbent litter material, that permits the pets to instinctively bury their waste. These litter boxes must be emptied and cleaned frequently to prevent odor problems and may also require scrubbing with deodorant and disinfecting cleanser prior to refilling with clean litter. Some of the commercially available absorbent cat litter materials create dust during pouring when cleaning or refilling the litter box. This dust may be hazardous to allergy victims, infants and pregnant women. Also, presently used litter boxes are not convenient for use when traveling. In our mobile society cat owners frequently carry their pets on auto trips, visits with relatives and when stopping over at motels. The known kitty litter boxes are generally not adaptable for use in such situations. Thus, there is a definite need in the art for an economical, disposable, kitty litter box that may be conveniently stored, transported and disposed of, once used, without creating additional environmental and health hazards.

It is therefore an object of the present invention to provide an economical, disposable, kitty litter box that may be transported or stored in a folded compact mode, unfolded or expanded to a use mode, and refolded after use for disposal.

Another object of the present invention is a disposable kitty litter box formed completely of bio-degradable and/or recyclable materials.

A further object of the present invention is a disposable kitty litter box that may be used, and discarded without exposing the pet owner or others to unnecessary odors and hazardous litter dust.

An additional object of the present invention is to provide a foldable, disposable, kitty litter box.

Summary of the Invention

According to the present invention, the foregoing and additional objects are attained by providing a foldable, expandable, container having an open end, a closed end wall, a top and a bottom wall and a pair of sidewalls connected to the top, bottom and closed end walls. A barrier wall is integral with and extends between the pair of sidewalls and is integral with the bottom wall adjacent the open container end. The height of the barrier wall is limited to a fraction of the height of the sidewalls and serves to close a fractional portion of the open end and form an open top compartment within the container. A quantity of absorbent litter material is disposed within the open top compartment over a moisture impervious barrier provided therein. The water impervious barrier is formed of a suitable wax or other bio-degradable coating material.

In the preferred embodiment, a crease is provided substantially along the center, and along a substantial length, of each of the two container sidewalls from the open container end toward the closed end wall thereof. These centrally located longitudinal creases each branch into a pair of creases extending at substantially a forty-five degree angle therefrom to end at the respective corners formed between the closed end wall and the top and bottom walls. At least one transverse crease is provided across at least one of the top and bottom walls at a distance spaced from the end wall equal to substantially one-half the height of the closed end wall.

Each sidewall is provided with an in-turned, isosceles triangular shaped, segment adjacent the bottom wall. These in-turned segments are adhesively secured to the inside portion of each sidewall and are integral with the ends of the barrier wall. The barrier wall has a height measurement equal to the measurement of the equal length sides of the triangular sidewall segments. Each end of the barrier wall is also provided with a crease extending at a forty-five degree angle from the corner thereof merging with the bottom and respective side walls to a point on the barrier wall located a distance from the sidewall equal to the height of the barrier wall.

These wall creases facilitate folding of the absorbent containing container into a compact package for transporting and storage and permit expansion of the container to provide an open end disposable kitty litter box. The top, bottom, end and sidewalls of the container are constructed of heavy gauge paper that will normally retain its expanded shape when the folded container is expanded into the open position. To further ensure the container remaining in the expanded position, a length of each side wall and the top wall is foldable back over itself a distance not exceeding the measurement of one of the equal length legs of the folded triangular segments of the sidewalls. A suitable dotted line or other indicia is provided on the exterior surfaces of the side and top walls to indicate the fold line for these walls. After use, these folded wall ends are unfolded to their original position and the container is readily folded again to its original storage position and may be discarded without the owner coming in contact with or being exposed to the litter contents therein.

BRIEF DESCRIPTION OF THE DRAWINGS

A more complete appreciation of the invention and many of the attendant advantages thereof will be readily apparent as the same becomes better understood with reference to the following detailed description when considered in connection with the accompanying drawings wherein:

FIG. 1 is a front perspective view of the disposable kitty litter box of the present invention in the expanded use position;

FIG. 1a is a partial view similar to FIG. 1 and illustrating the structure maintaining the container in the expanded position;

FIG. 2 is a side view of the litter box shown in FIG. 1 in the folded, non-use position as employed for shipping, storage and disposal;

FIG. 3 is a sectional view of the litter box shown in FIG. 1 and taken along line III—III thereof;

FIG. 4 is a top view of the bottom wall of the litter box shown in FIG. 1 with parts omitted and illustrating an alternate embodiment of the invention;

FIG. 5 is a sectional view on the entire litter box partially shown in FIG. 4 and as would be seen along line V—V therein;

FIG. 6 is a view similar to FIG. 1a with portions omitted and illustrating another embodiment of kitty litter retention structure in the kitty litter box of the present invention; and FIG. 7 is a sectional view taken along line VII—VII of FIG. 6.

DETAILED DESCRIPTION

Referring now to the drawings and more particularly to FIGS. 1 and 1a, there is shown the preferred embodiment of the present invention in the expanded or use position and designated generally by reference numeral 10. Litter box 10 is a foldable, expandable, container having an open end 11, a closed end 13 (visible in FIG. 2), a top wall 14, a bottom wall 16 and a pair of sidewalls 18,20. Sidewalls 18,20 are each integral along one edge thereof with top wall 14, bottom wall 16 and end wall 20 11. A barrier wall 22 is integral with and extends between the pair of sidewalls 18,20 and is integral with bottom wall 16 adjacent open end 11. The height of barrier wall 22 is limited to a fraction of the height of sidewalls 18,20 and serves to close a fractional portion of the open end 11 to form an open top compartment within container 10.

This open top compartment in container or box 10 serves to contain a quantity of absorbent, granular material as will be further explained hereinafter. In fabrication of disposable kitty litter box 10, the entire structure is initially formed with top wall 14, bottom wall 16 and sidewalls 18,20 each having equal lengths. During the final fabrication process, a portion of bottom wall 16 is folded within the open end 11 of box 10 along with isosceles triangular segments 24,25 on respective sidewalls 18,20 at the point where bottom wall 16 merges with the sidewalls. Each in-turned or folded triangular segment 24,25 is adhesively attached to the overlapped portion of its respective sidewall, while the portion of bottom wall 16 in-turned or folded within opening 11 remains unattached and serves as barrier wall 22. The ends of barrier wall 22 are each provided with a crease extending at a forty-five degree angle from the corner thereof merging with bottom wall 16 and sidewalls 18,20 as designated respectively by reference numerals 27,28. Creases 27,28 each extend to a point on barrier wall 22 located a distance from respective sidewalls 18,20 equal to the height of barrier wall 22 and serve to assist in folding of box 10 as will be further explained hereinafter.

As illustrated in the embodiment shown in FIGS. 1 and 1a, a crease is provided substantially along the center, and along a substantial length, of each of sidewalls 18,20 and extends from the open container end 11 toward the closed end wall 13 thereof, as designated, respectively, by reference numerals 30,31. Each of these centrally located creases branches into a pair of creases extending at substantially a forty-five degree angle therefrom to end at the respective corners formed between the closed end wall 13 and top and bottom walls 14 and 15. The pair of branch creases for sidewall 18 is shown in FIG. 1 and designated by reference numerals 33,34.

In the illustrated embodiment of FIG. 1, a transverse crease 35 is provided across top wall 14 at a distance spaced from, and equal to substantially one-half the height of, closed end wall 13. A similar transverse crease may also be provided on bottom wall 16 in addition to, or in lieu of, crease 35 on top wall 14. All of the described wall creases facilitate folding of container 10 into a compact package for transporting, storage and disposal and permit easy expansion of container 10 when ready for use as a disposable kitty litter box.

The top, bottom, end and sidewalls of container 10 are constructed of heavy gauge paper that will normally retain its expanded shape when the folded container is expanded from the folded mode shown in FIG. 2 to the expanded mode shown in FIGS. 1 and 1a. The heavy paper employed for making heavy weight paper bags is adequate for this purpose and, in particularly, paper in the forty to eighty pound category, and preferably paper in the sixty-eighty pound range. A paper bag formed of this weight paper will normally retain its expanded shape when the folded container 10 is expanded from the folded position shown in FIG. 2 to the open position shown in FIG. 1. To further ensure the container 10 remaining in the expanded position, a length of each sidewall 18,20 and a length of top wall 14 is manually folded back over itself a distance not exceeding the measurement of one of the equal length legs of the folded triangular segments 24,25 of respective sidewalls 18,20.

To assist in determining the maximum distance that sidewalls 18,20 and top wall 14 are folded back over themselves, a dotted fold line, or other suitable indicia, is provided on the exterior surface of top wall 14 and each sidewall 18,20. The fold line for top wall 14 is designated by reference numeral 36 while the fold line for sidewall 18 is designated by reference numeral 37 in FIG. 1, with the fold line for sidewall 20 not being visible in this FIG. Other indicia or instructions, such as the word "fold", are provided adjacent dotted fold lines 36,37, as desired or needed. FIG. 1a illustrates container 10 with each of sidewalls 18,20 and top wall 14 folded back and thereby causing barrier wall 22 to remain in the unfolded or vertical position to serve as a closure for a fraction of open end 11.

Referring now more particularly to FIG. 2, container 10 is shown in the folded mode as employed for storage, shipping and disposal after use. As shown therein, bottom wall 13 folds at crease line 35 on top wall 14, with creases 30,31 on sidewalls 18,20 and respective branch creases 33,34 on sidewall 18 and similar creases, not shown, in sidewall 20 permitting the sidewalls to fold inwardly to form a compact, relatively flat container structure 10.

FIG. 3 illustrates a sectional view of the folded container 10 shown in FIG. 2 as seen looking along line III—III thereof. The entire inside surfaces of top wall 14, bottom wall 16, end wall 13 and sidewalls 18,20 are covered with a moisture impervious layer of wax or other suitable bio-degradable or recyclable, moisture barrier material, as designated by reference numeral 38. When this embodiment of the disposable litter container 10 is expanded and the unattached ends of sidewalls 18,20 and top wall 14 folded back as shown in FIG. 1a, an area bounded by barrier wall 22, bottom wall 16 and sidewalls 18,20 forms an open top compartment that serves to receive and retain a quantity of loose granular, absorbent material litter material therein.

Referring now more particularly to FIGS. 4 and 5, an embodiment of the present invention is shown wherein a pocket 40 is provided within container 16 to receive a quantity of the absorbent litter material. Pocket 40 may be formed in the manufacturing process of making container 10 wherein three edges 41,42 and 43 of a paper layer are adhesively attached along their entire length to bottom wall 16. The fourth edge 44 of pocket 40 is also adhesively attached to bottom wall 16 over the major portion of the length thereof so as to leave an unattached area forming an opening 45. Opening 45 permits the subsequent filling of pocket 40 with a quantity of absorbent litter material 47 (FIG. 5) in a conventional manner. A portion of a flap or tab 48 covers opening 45 to seal the absorbent material contents therein. Tab 48 also permits pulling thereon to remove pocket 40 along perforated line 49 to release or expose the absorbent litter material contents 47 when it is desired to put container 10 into use.

Referring now to FIGS. 6 and 7, another embodiment of the present invention is shown wherein an absorbent litter material 47 is packaged within a cardboard or similar box 51 and sealed therein via a removable paper cover 52. Box 51 is lined with a wax or other suitable water impervious, bio-degradable or recyclable material 53 and is adapted to slide into the open end 11 of container 10 when the container is placed in the unfolded use position as illustrated in FIGS. 1 and 1a.

The operation of the invention is now believed apparent. The container 10 is manufactured by a suitable paper bag manufacturer with all creases described being formed during the manufacturing process and the dotted lines and any other indicia desired printed thereon. The bag or container 10 is manufactured with pocket 40 formed therein, as in the embodiment illustrated in FIGS. 4 and 5, or without pocket 40 as illustrated in the embodiments illustrated in FIGS. 1 and 6. When purchased by a user, container 10 is unfolded from the position shown in FIGS. 2, 3 and 5 to the open position of FIGS. 1, 1a and 6. Referring to FIGS. 1 and 1a, sidewalls 18,20 and the end of top wall 14 at the open end 11 of container 10 are folded along dotted lines 36, 37 (and the other line not visible in the drawing) back over the exterior surfaces thereof as illustrated in FIG. 1a. These folded segments add strength to sidewalls 18,20 and top wall 14 and assist in maintaining container 10 in the expanded or unfolded position and to assist in maintaining barrier wall 22 taut across the open end 11. When employing loose granular, absorbent, litter material the material is poured directly into container 10 to a depth short of the height of barrier wall 22. Normally, a depth of two and one-half to three inches of litter material is adequate.

When employing the embodiment illustrated in FIGS. 4 and 5, pocket 40 is filled with the granular, absorbent, litter material prior to sale of container 10 to the consumer. In this embodiment litter material 47 is disposed within pocket 40 by a conventional process effecting closing of opening 45 therein and leaving tab 48 in an exposed position, as illustrated in FIG. 4. After container 10 is placed in the expanded condition shown in FIG. 1a, tab 48 is manually pulled to remove the pocket 40 along perforated line 49 and expose the litter material contents 47 for use. Pocket 40 is designed to contain adequate absorbent material 47 to cover bottom wall 16 to a depth of at least two and one-half inches.

When employing the embodiment illustrated in FIGS. 6 and 7, a separate box 51 of kitty litter material 47 is placed within container 10 and removable paper cover 52 thereon removed to expose the absorbent litter material for use. Paper cover 52 may be provided with suitable perforations and pull tabs (not illustrated) to assist in removal thereof as so desired. Box 51 contains at least two and one-half inches of litter material and is also lined with a wax or other moisture impervious internal surface 53.

In each embodiment described and shown herein, kitty litter box 10 is adapted to be folded after use from the position shown in FIG. 1a to that shown in FIG. 1, to that shown in FIGS. 2, 3 or 5 without requiring contact with or exposure to the soiled absorbent material. The entire package is economical to replace and, since all materials employed in the container 10 are bio-degradable or recyclable, the entire package may be discarded without endangering the environment.

Although no specific dimensions have been discussed for container 10, in the preferred embodiment barrier wall has a height of four inches, sidewalls 18, 20 and top wall 14 each have a length selected from twelve-eighteen inches (preferably fourteen-sixteen inches) from end wall 13 to the dotted lines 36, 37 and a foldable length of four inches extending beyond the dotted lines to the end of container 10. The height of the preferred embodiment is sixteen inches and the width for each of top and bottom walls 14, 16 is twelve inches. The four inch height for barrier wall 22 has proved adequate to essentially eliminate the pet user from scratching litter particles out of box 10 when the litter material is confined to less than three inches depth.

Although the invention has been described relative to specific embodiments, it is not so limited and these examples are to be considered as exemplary only and are not to be deemed exhaustive. For example, although the invention as described, recites the use of specific weight paper, it is to be understood that other and lighter weight recycled or virgin paper may be employed for the construction of container 10. When using lighter weight paper, additional mechanism may be employed if required to maintain container 10 in the unfolded or expanded mode. In this situation suitable stays of cardboard or other recyclable material may be employed in sidewalls 18, 20 and/or top wall 14, at open end 11 of container 10, without departing from the spirit and scope of the present invention. Also, when the disposable kitty litter box 10 is employed only for small kittens it obviously may be constructed of a smaller size than that described in the specific examples herein. These and other variations and modifications of the described specifice embodiments will be readily apparent to those skilled in the art in the light of the above teachings. It is therefore to be understood that, within the scope of the appended claims, the invention may be practiced other than as specifically described herein.

What is claimed as new and desired to be secured by Letters Patent of the United States is:

1. A disposable kitty litter box comprising:
   a container having an open end, a closed end wall, a top and a bottom wall, and a pair of side walls connected to said top and bottom walls and said closed end wall;
   a barrier wall extending between said pair of side walls and secured to said bottom wall;
   said barrier wall having a height limited to a fraction of the height of said closed end wall and being disposed adjacent said open end to thereby close a fractional portion of said open end and form an open top compartment within said container;
   a moisture impervious layer lining the interior surfaces of said open top compartment;
   a quantity of absorbent litter material disposed within said open top compartment;

means facilitating folding and unfolding of said container walls to permit said container to be placed in a compact folded mode for movement and storage and to permit said container walls to be unfolded to place said container, in an expanded mode for utilization thereof as a sanitary relief box for felines;

said means facilitating folding and unfolding of said container walls including at least one crease provided along a substantial length of each of said side walls of said container and at least one crease provided transversely across at least one of said top and said bottom walls;

said at least one crease provided along a substantial length of each of said side walls of said container including a longitudinally extending crease leading from said open end of said container and branching into a pair of angular extending creases at a distance spaced from said closed end wall; and said angular extending creases each forming a straight line leading from said longitudinal crease at substantially a forty-five degree angle to respective corners formed between said closed end wall and said top and said bottom walls.

2. The disposable kitty litter box of claim 1 wherein said at least one crease provided transversely across at least one of said top and said bottom walls is spaced from said end wall a distance equal to substantially one-half the height of said closed end wall.

3. The disposable kitty liter box of claim 1 including removable cover means disposed over said quantity of absorbent litter material disposed within said compartment.

4. A disposable kitty litter box comprising:
a container having an open end, a closed end wall, a top and a bottom wall, and a pair of sidewalls connected to said top and bottom walls and said closed end wall;
a barrier wall extending between said pair of sidewalls and secured to said bottom wall;
said barrier wall having a height limited to a fraction of the height of said closed end wall and being disposed adjacent said open end to thereby close a fractional portion of said open end and form an open top compartment within said container;
said open top compartment adapted to receive a quantity of absorbent litter material;
a moisture impervious layer provided within said container and lining at least the interior surfaces of said open top compartment;
means facilitating folding and unfolding of said container walls to permit said container to be placed in a compact folded mode for movement and storage and to permit said container walls to be unfolded to place said container in an expanded mode for utilization thereof as a sanitary relief box for felines; and
said barrier wall being formed of a continuation and in-turned portion of said bottom wall to thereby result in said top wall and said sidewalls having a length exceeding said bottom wall by a distance equal to the height of said barrier wall.

5. The disposable kitty litter box of claim 4 including retention means for releasable retaining said container in said expanded mode, said retention means including portions of said top and said sidewalls at the open end of said container folded to thereby double the thickness of said top and said sidewalls at the open end of said container over a distance equal to the height of said barrier wall and place said top and said sidewalls flush with said barrier wall.

6. The disposable kitty litter box of claim 4 including a pocket disposed within said open top compartment;
said pocket comprising a paper layer bonded to said bottom wall and having a quantity of granular, absorbent material disposed therein; and
means facilitating opening of said pocket to release said granular, absorbent material within said open top compartment.

7. The disposable kitty litter box of claim 4 including a separate box containing a quantity of granular, absorbent material disposed within said open top compartment;
said separate box having a moisture impervious liner covering the entire interior surface thereof; and
a separate removable paper layer cover disposed over said quantity of granular, absorbent litter material within said separate box.

8. A method of making a disposable kitty litter box comprising: making a paper container having an open end, a closed end, a top wall, a bottom wall, and a pair of sidewalls connected to said top and bottom walls and said closed end wall, and adapted to be folded for shipping and storage and to be unfolded or expanded for use as a disposable kitty litter box;
providing a moisture impervious coating over at least portions of the interior of the paper container;
forming creases in said sidewalls and in at least one of said top and said bottom walls to facilitate folding and unfolding of said container;
forming a barrier wall at the open end of the container to close a fractional area of the open end of the container when in the unfolded or expanded mode by folding a portion of the bottom wall within the open end of the container;
simultaneously folding an isosceles triangular segment on each sidewall, at the open end of the container where the bottom wall merges with the sidewalls to thereby leave the remaining portion of the sidewalls and the top wall exceeding the length of the bottom wall by a distance equal to the width of the barrier wall;
adhesively attaching each of the triangular segment portions to its respective sidewall;
forming a crease on each end of the barrier wall extending at a forty-five degree angle from the corner thereof that merges with the bottom wall and the respective sidewalls to assist in folding of the container;
whereby, when the container is in the folded mode, the barrier wall will be in-turned over the bottom wall and when the container is in the unfolded mode the barrier wall will be moved to a vertical position relative to the bottom wall to thereby close a fractional portion of the open end of the container and, together with the closed end wall and the sidewalls form an open top compartment within the container.

9. The method of claim 8 including assisting in maintaining the container in the unfolded expanded mode by folding a length of the top and sidewalls back over themselves a distance substantially equal to the height of the vertical barrier wall and place the ends of the top and sidewalls substantially flush with the barrier wall.

10. The method of claim 8 including pouring a quantity of granular, absorbent litter material within the open top compartment formed by the barrier wall, the closed end wall and the sidewalls.

11. The method of claim 8 including forming a pocket in the container by adhesively attaching a paper layer to, and parallel with, the bottom wall and, providing a quantity of granular, absorbent litter material within the pocket and providing tearable portions in the paper layer to permit release of the litter material within the open top compartment when desired.

12. The method of claim 8 including providing a separate cardboard box within and essentially conforming in shape and size to the open top compartment, providing a moisture impervious coating over the interior surfaces of the cardboard box, providing a quantity of granular, absorbent litter material within the cardboard box, and providing a rupturable cover on the cardboard box to retain the granular, absorbent litter material therein and permit exposure thereof when desired.

* * * * *